C. BOSCH.
PROCESS FOR THE PRODUCTION OF OXIDE OF NITROGEN FROM AMMONIA BY CATALYTIC OXIDATION.
APPLICATION FILED JULY 9, 1920.
1,426,952.
Patented Aug. 22, 1922.
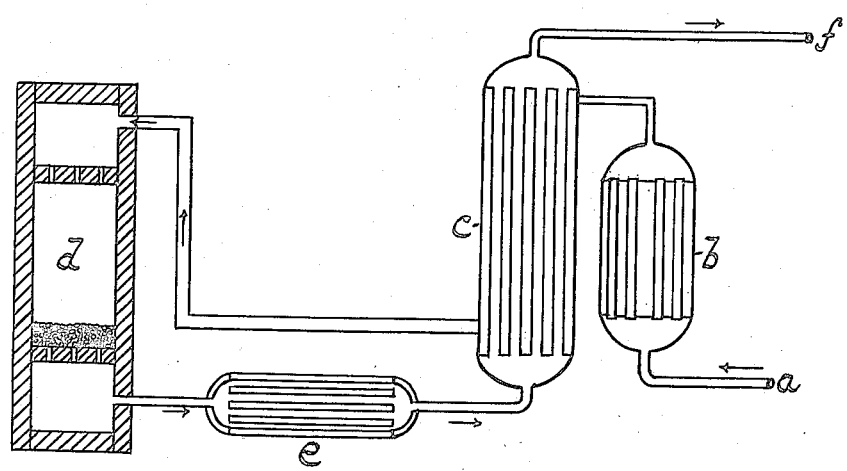
INVENTOR.
*Carl Bosch*
BY *Hauff-Harland.*
ATTORNEYS

UNITED STATES PATENT OFFICE.

CARL BOSCH, OF LUDWIGSHAFEN-ON-THE-RHINE, GERMANY, ASSIGNOR, BY MESNE ASSIGNMENTS, TO BADISCHE ANILIN & SODA FABRIK, OF LUDWIGSHAFEN-ON-THE-RHINE, BAVARIA, GERMANY, A CORPORATION OF THE GRAND DUCHY OF BADEN.

PROCESS FOR THE PRODUCTION OF OXIDES OF NITROGEN FROM AMMONIA BY CATALYTIC OXIDATION.

1,426,952.  Specification of Letters Patent.  Patented Aug. 22, 1922.

Application filed July 9, 1920. Serial No. 395,148.

*To all whom it may concern:*

Be it known that I, CARL BOSCH, citizen of Germany, residing at Ludwigshafen-on-the-Rhine, Germany, have invented new and useful Improvements in Processes for the Production of Oxides of Nitrogen from Ammonia by Catalytic Oxidation (for which I have filed applications in Germany April 1, 1916, Austria March 3, 1917, and Hungary March 5, 1917), of which the following is a specification.

In the manufacture of oxides of nitrogen by catalytic oxidation of ammonia by oxygen or gases containing oxygen it is desirable to dispense with any external source of heat except initial ignition. With this object in view the mixture of the gases for supply has hitherto been conveyed through tubes surrounding the contact-tube and thus preheated by the drawn-off gases as well as by the heat of the contact-mass (see e. g. U. S. Letters Patent 858904).

When this method, however, was adapted to tubes of large size great difficulties arose, particularly owing to the uneven temperature of the contact-mass, caused by the more effective removal of heat near the walls, as well as to the difficulties in preheating, without decomposition, large quantities of the air-ammonia-mixture.

I have now found that these difficulties are removed if instead of conveying the gas mixture containing ammonia and oxygen along the hot contact tube the mixture of the gases is preheated by means of the drawn-off gases and the heating completed by the radiation of the red-hot contact-mass, the gas mixture in the last stage coming into contact only with such materials as have no, or no essential catalytic influence on it. I further prefer to carry out the process in such a way that also the drawn-off gas having a temperature of nearly 700 degrees centigrade is not directly employed but is first deprived of a considerable part of its heat—down to a temperature not essentially exceeding 400 degrees centigrade—and then introduced into the metallic heat-exchanger, serving for preheating the gas mixture. Thus, especially when iron heat-exchangers are used, an injurious premature reaction of the air-ammonia-mixture is avoided and at the same time a very favorable heat-economy is effected, by utilizing the surplus heat contained in the escaping gases for any other suitable purpose as for example in steam generators.

It has further proved advantageous, especially when iron heat-exchangers are used, to slightly preheat to about 100 degrees centigrade the gas mixture containing the ammonia and oxygen before its entering the heat-exchanger. This can be done for example by means of steam. Thereby some peculiar destructive influences are eliminated which are usually noticed when iron heat-exchangers are used for this purpose and which in a short time would cause the destruction of the apparatus. When other metals, for example aluminium, or magnalium, are employed, this precaution is of less importance.

In order to sufficiently heat the gas mixture, for example from an initial temperature of say 200 degrees centigrade to a temperature of 400 degrees centigrade or more by the heat radiated from the contact-mass, sufficient space is provided in front of the contact-mass in order to expose the gas mixture to the heat radiation of the contact-mass for a distance of say 1 metre or more, but preferably of not less than 0.5 metre. At the same time, as already stated, the gas is only allowed to come into contact with materials which in spite of the high temperatures will not exercise a catalytic influence on the mixture, by producing nitrogen oxides or nitrogen. Therefore I avoid metals such as iron or copper (other metals as for instance aluminium and magnalium are less unfavorable) and I prefer linings of the reaction chamber of non-metallic materials for example china, fire-clay or heavy magnesia and the like.

As catalytic agents precious metals, especially the metals of the platinum group as well as base metals or their compounds may be employed either in the form of thin layers or of thicker beds, as circumstances may require.

The following example and the diagrammatical drawing annexed to this specification will serve to further illustrate the nature of my invention and the manner in which it may be carried out, but the invention is not restricted to the example.

The gas mixture to be subjected to the catalytic oxidation is introduced through pipe *a*, and after suitably preheating in a manner which will be more fully explained below it is subjected to the action of the catalyst and after giving off its heat leaves the system at *f*.

The reaction chamber *d* is arranged vertically and lined with fire-clay and contains a perforated plate bearing a layer of contact-mass, of 10 or 15 centimetres depth, of granulated iron oxide, suitably rendered active, and above this layer, at a distance of about from 0.8 to 1.2 metres, a distributing plate through which the preheated ammonia-air-mixture enters. The gas mixture containing nitrogen oxides leaving the catalyst which is kept at about 750 degrees centigrade, enters a boiler *e*, for generating steam, its temperature being in consequence lowered to about 400 degrees centigrade. The gas mixture is afterwards passed through a heat-exchanger *c*, having, for example, the form of a system of iron pipes, where it preheats, in a counter current, up to 250 degrees centigrade or even more, the fresh ammonia-air-mixture (containing about 7 per cent of ammonia) which previously has been heated in another preheater *b* to about 100 degrees centigrade by means of steam. The preheated gas mixture intended for the catalytic process now reaches the reaction chamber through the aforesaid distributing plate, consisting of fire-clay, and the preheating is there completed by heat radiation from the contact-mass so that the freshly arriving gas mixture will not extinguish or indeed cool the contact-mass when meeting it, but maintains its temperature continuously without any introduction of additional heat from the outside. Under these circumstances the yield of nitrogen oxide amounts, in case of an active contact-mass, even if the latter be formed of base metals, or their oxides to say 90 per cent, or even more and at the same time a considerable quantity of heat is recovered which in the form of steam can be utilized for other purposes.

I claim:—

1. In the manufacture of oxides of nitrogen from ammonia by catalytic oxidation, the steps consisting in first preheating the gas mixture containing ammonia and oxygen with the aid of the drawn-off reaction gases and completing its heating on the way to the contact-mass by arranging a spacious room in front of the contact-mass enabling the gas mixture to be exposed to the heat radiated from the said contact-mass on a way of not less than about half a metre, the gas mixture coming in this room into contact only with materials which have no essential catalytic influence on it.

2. In the manufacture of oxides of nitrogen from ammonia by catalytic oxidation, the steps consisting in first preheating the gas mixture containing ammonia and oxygen by any source of heat to about 100 degrees centigrade, then further heating it in heat-exchangers with the aid of the drawn-off reaction gases and completing its heating on the way to the contact-mass by the heat radiated from the latter, the gas mixture coming in this stage into contact only with materials which have no essential catalytic influence on it.

3. In the manufacture of oxides of nitrogen from ammonia by catalytic oxidation, the steps consisting in first preheating the gas mixture containing ammonia and oxygen with the aid of the drawn-off reaction gases which have previously been deprived of a part of their heat, so as to enter the heat-exchanger at a temperature not substantially exceeding 400 degrees centigrade and completing its heating on the way to the contact-mass by the heat radiated from the latter, the gas mixture coming in this stage into contact only with materials which have no essential catalytic influence on it.

4. In the manufacture of oxides of nitrogen from ammonia by catalytic oxidation, the steps consisting in first preheating the gas mixture containing ammonia and oxygen in an iron heat-exchanger with the aid of the drawn-off reaction gases and completing its heating on the way to the contact-mass by arranging a spacious room in front of the contact-mass enabling the gas mixture to be exposed to the heat radiated from the contact-mass on a way of not less than about half a metre, the gas mixture coming in this room into contact with materials which have no essential catalytic influence on it.

In testimony whereof I have hereunto set my hand.

CARL BOSCH.